United States Patent [19]

Franklin

[11] Patent Number: 4,757,423
[45] Date of Patent: Jul. 12, 1988

[54] FUSE FOR ELECTRONIC COMPONENT

[75] Inventor: Robert W. Franklin, Paignton, Great Britain

[73] Assignee: STC plc, London, England

[21] Appl. No.: 14,481

[22] Filed: Feb. 13, 1987

[30] Foreign Application Priority Data

Feb. 15, 1986 [GB] United Kingdom ............... 8603788

[51] Int. Cl.$^4$ .................. H01G 9/00; B01J 17/00; H01H 85/16
[52] U.S. Cl. .................... 361/275; 337/232; 361/433
[58] Field of Search ........... 361/272, 275, 274, 433, 361/306, 402, 404; 337/142, 232; 169/42; 122/504.1; 493/948

[56] References Cited

U.S. PATENT DOCUMENTS

| 1,533,498 | 4/1925 | Hickey | 337/232 |
| 3,270,261 | 8/1966 | Mohler et al. | 361/433 X |
| 3,588,618 | 6/1971 | Otte | 361/404 X |
| 4,039,904 | 8/1977 | Klein et al. | 361/433 |
| 4,068,291 | 1/1978 | Pierpont | 361/433 |
| 4,107,762 | 8/1978 | Shirn et al. | 361/433 |
| 4,121,277 | 10/1978 | Hilbert | 361/433 |
| 4,409,642 | 10/1983 | Edson | 361/433 |
| 4,591,951 | 5/1986 | Iwamoto et al. | 361/433 X |

FOREIGN PATENT DOCUMENTS

| 203406 | 11/1955 | Australia | 361/274 |
| 2423867 | 12/1974 | Fed. Rep. of Germany | 361/306 |

OTHER PUBLICATIONS

I.B.M. Technical Disclosure Bulletin, Oct. 1958, vol. 1, No. 3, pp. 1 & 2.

Primary Examiner—Donald A. Griffin
Attorney, Agent, or Firm—Lee & Smith

[57] ABSTRACT

A solid electrolytic capacitor has an anode body (1) and an anode wire (2) and lead out connections (8, 3). In series with the connections and the body is a fusable link (6) formed of a composite of low melting point conductive plastics metal matrix. The fusable link (6) is in the form of a pad of this material. In a preferred form this material is made by compressing into sheets metal-coated polymer particles. The sheet is cut into pads and inserted into the capacitor assemblies to act as a combined thermal and electrical fuse. Preferably the pads are less than 1 mm thick and coated on both sides with solder and approximately 1 mm square. The pads can be reflow soldered between the anode and the lead frame or negative wire termination. Alternatively it can be reflow soldered between the anode wire and the positive wire termination. As the current reaches high level if a fault develops in the capacitor, the metal layer will melt and also melt the plastics. The metal will then disperse in the liquid plastics and on cooling will not re-establish conduction because it is no longer in the same physical form.

Alternatively the fusible link comprises metal-coated polymer particles dispersed in a resin binder and applied as a conductive paste.

10 Claims, 2 Drawing Sheets

FUSE FOR ELECTRONIC COMPONENT

This invention relates to a fuse for an electronic component particularly but not exclusively a solid electrolytic capacitor.

Solid electrolytic capacitors are sometimes employed as AC filters and as such are connected across a low impedance DC power source. If there is a fault in the dielectric film of the solid electrolytic capacitor, a large current will flow which can heat the capacitor to a very high temperature. Such a fault current flowing in a shorted tantalum capacitor can raise the temperature of the anode to a self-sustaining combustion temperature which raises a serious fire risk and would at least damage nearby electronic components on a printed circuit board.

U.S. Pat. No. 4,107,762 describes these problems and also the problems of fusing a solid electrolytic capacitor and explains the difficulties involved. This U.S. patent proposes a solution in which the fuse is made of two exothermically alloyable metals such as aluminium and palladium. However it is believed that the tiny diameter of the proposed fuse wire will add unnecessary resistance to the capacitor and it is also believed that this type of arrangement is difficult to manufacture.

Another proposal is described in German patent DE No. 3240194 and utilises a solder bridge and provides a space for the solder to disperse in when it melts under fault conditions of the capacitor. This solution is thought to be unreliable in operation, because the solder bridge although it melts at a temperature below the critical self-sustaining burning temperature for the capacitor, may re-establish a connection upon cooling. That is to say there is no guarantee that the solder bridge will disperse and not effectively "re-set" itself upon cooling.

Yet another proposal is disclosed in British Patent No. 1466004 which discloses a finely-divided conductive powder e.g. a tin-lead eutectic, a phenol resin and silica powder, hot rolled to form a mixture which is subsequently crunched into granules and subsequently extruded to form cylindrical resistor bodies. These bodies can form cut-out devices. It is believed however that the operation is not reliable because of the high quantity of metal in the mixture, i.e. 30% by weight or greater.

It is an object of the present invention to provide a fuse for a solid electrolytic capacitor which is cheap to manufacture and reliable in operation.

According to the present invention there is provided an electrical capacitor comprising a capacitor body which provides the capacitance in use of the capacitor, and lead out terminals for externally connecting the capacitor into an electrical circuit, and a fusable link connected in series with the capacitor body and between the body and one of the connection terminals, said fusable link comprising a matrix of conductive and insulating materials, comprising or derived from metal-coated particles, which is highly conductive under normal operating conditions of the capacitor but which fuses permanently at a temperature below the self-sustaining burning temperature of the capacitor body or any encapsulation around the capacitor body.

According to another aspect of the present invention there is provided a fusable link for an electronic component, comprising a pad of material formed of a matrix of conductive and insulating materials, comprising or derived from metal-coated particles, which is highly conductive at normal operating temperature of the component but which will provide an open circuit at a temperature above the normal operating temperature of the component and below the self-sustaining burning temperature of the component or its encapsulation.

According to a further aspect of the present invention there is provided a material comprising metal-coated particles dispersed in a liquid resin binder to form a conductive paste which, when the binder has hardened, forms an electrically conductive fusible link.

In order that the invention can be clearly understood reference will now be made to the accompanying drawings in which.

Figure 1:
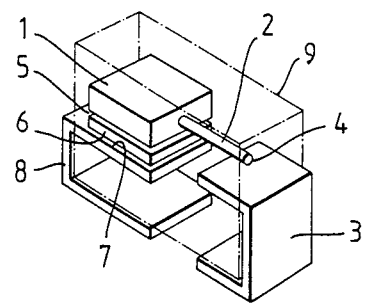
FIG. 1 shows schematically the construction of a surface-mountable chip tantalum capacitor incorporating a fuse according to an embodiment of the present invention.

In the embodiments to be described it is proposed to provide a fusable link interposed directly between the connection terminal of the capacitor and either the body or cathode region of the capacitor, or between the external connection terminal and the conventional anode wire of the capacitor. In particular the fusable link proposed comprises a mixture of a highly conductive metal and a second material of comparatively low conductivity and preferable having good insulating properties. For the purposes of this invention it is proposed to define the second material as an insulator although it is to be understood that such materials could have an electrical specific resistance as low as 1000 ohms.

One particularly suitable form of link comprises a metal/plastics matrix in which the metal content is of the order of 1% by volume. In one form of this matrix, spherical polystyrene particles, about 1 mm in diameter, are coated by electroless deposition of copper, nickel or copper/nickel thin layers. The metal-coated polystyrene particles are moulded at high temperature and pressure into plaques, in which the metallic shell continuity is preserved in a continuous polystyrene matrix formed from the coated particles during the moulding operation. Very high conductivities at low metal concentrations (less than 1% v/v) can be obtained by this procedure. A discussion of such materials can be found in the article "Electrical properties of composite mouldings of metal coated polymer particles" by M. Narkiss et al, 40th Annual Conference, Reinforced Plastics/Composites Institute, The Society of the Plastics Industry, Inc. Jan. 28, Feb. 1, 1985.

In this article, thin metal shells (0.5 to 4.0 microns increasing with the metal concentration in the composite) were deposited on polymer particles, resulting in a metal-coated polystrene powder. Under compression moulding conditions at high pressure and temperature the metal shells deform and crack and some of the molten polymer squeezes out to form a continuous polystyrene matrix. The general shell-like structure of the metal is retained and a unique conducting network is produced. Such composites consist, therefore, of essentially two continuous phases, namely, the polymer phase occupying about 99% of the volume and the metal phase occupying the remaining approximately 1% of the volume, or less. It is apparently important that the dual continuity requirement is met in order to obtain a product with good conductivities and reasonable physical properties. When the metal concentration is either too low or too high, the dual continuity requirement cannot be satisfied. The formation of an efficient continuous metal network at a given metal concentration depends on the degree of fracturing and grinding of the shells during processing. The shell-like structure will apparently be destroyed in processing methods involving excessive sheer conditions and the materials will become insulating.

It is proposed to cut the plaques of moulded metal-coated polystyrene particles into small pads and these pads are sufficient in size to be soldered to the body of the capacitor on the one hand or the anode wire, and two the lead out wire or lead frame connection, on the other hand.

Referring now to FIG. 1 of the drawings there is shown schematically a surface mounted solid electrolytic tantalum capacitor comprises an anode body 1 having an anode wire 2 connected to an anode lead frame 3 by welding at 4.

The surface of the anode 1 has a conductive surface 5 and a fusable link 6 comprising the above-mentioned pad of polymer-metal matrix made as discussed in the above mentioned article, is soldered to the conductive surface 5 of the anode 1, on the one hand, and to the facing surface 7 of the cathode lead frame 8. The fusable pad 5 is less than 1 mm thick and about 1 mm square and provides a highly electrically conductive link, has a large surface area for soldering and thus is easy to handle for manufacturing, and will when the temperature exceeds about 300° C., change its physical form so that there is no longer electrical continuity between the metal coatings of the particles of the pad, thus becoming permanently insulating and acting as a fuse between the cathode lead frame 8 and the facing surface of the anode 1.

Thus should the anode 1 develop a fault during use so that a large current, for example several amps begins to flow, then the pad 6 will fuse permanently.

The structure shown in FIG. 1 will be encapsulated in resin indicated in broken line by the reference numeral 9. Reference can with advantage be had to our earlier European patent application No. 84303831.6 (A. R. Conquest 4-2) which is directed to an inventive form of lead frame construction for a surface mounted solid electrolytic capacitor.

Figure 2A:
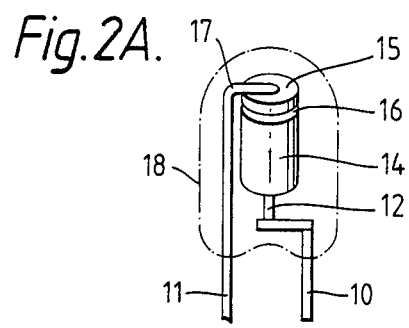
FIGS. 2A and 2B show alternative constructions for resin dipped solid tantalum capacitor incorporating a fuse according to two further embodiments of the invention.

Referring now to FIG. 2A, there is shown a resin-dipped capacitor with radial leads 10 and 11, lead 10 being cross-welded to anode wire 12 at 13, the anode wire 12 extending from the anode body 14. A pad 15 comprising a fusable link and made and constructed in the same way as the fusable link 6 of FIG. 1, but this time of disc-like form to conform to the circular shape of the anode body 14, is soldered to the end surface 16 of the anode body 14 and to the other side of the pad is welded or soldered the bent over end 17 of the lead wire 11.

The whole construction is dipped in resin to form an encapsulation and this encapsulation is indicated in broken line by reference numeral 18.

Figure 2B:
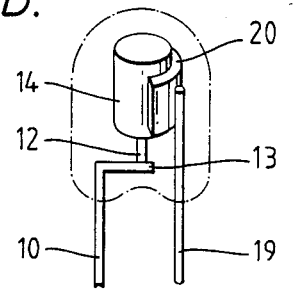

An alternative construction for a radial-lead resin-dipped capacitor, is shown is FIG. 2B where instead of the fusable link 15 of FIG. 2A being mounted on the end of the anode body, this time it is mounted on the cylindrical surface of the anode body 14 by means of solder and to the opposite surface of the pad 20 is soldered the second lead out wire this time indicated by reference numeral 19. Once again the whole construction is encapsulated in resin by a dipping process well known in the art.

Figure 3:
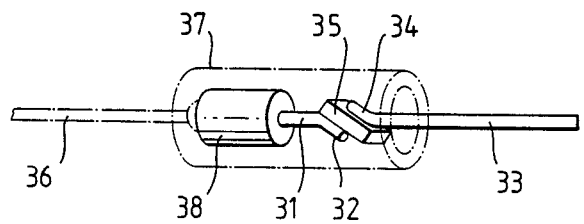
FIG. 3 shows a solid tantalum capacitor having an axial lead construction and incorporating a fuse according to a fourth embodiment of the invention.

Referring to FIG. 3 an axial lead solid electrolytic capacitor is shown, comprises an anode body 38 having an anode wire 31 obliquely bent at its end portion 32. One of the lead wires 33 has a correspondly bent end portion 34 so that between the obliquely bent end portions 32 and 34 is defined a parallel-sided space in which is located a fusable link 35 similar to the links previously described. It is soldered on its opposite faces of the two wire portions 32 and 34.

The other lead wire 36 is affixed e.g. by welding to a case 37, both shown in broken line, in which the anode body 38 is installed and connected by solder to form the cathode connection of the capacitor. Once again the fusable link 35 operates in the same way as previously discussed and will fuse at a temperature at or exceeding 300° C.

There has been described above a novel fusable link for a solid electrolytic capacitor which is easy to handle and reliable in operation. It does not require any space in which to evaporate as is the case with a conventional fuse wire, and it is reliable in operation in comparison to a solder blob which may in fact remake its connection after melting.

As described above, the fuse is made from plated plastic beads (such as polystyrene suspension beads) which have been compressed at elevated temperature into a solid self-supporting plaque which is then divided into the fuse pads. However such pads may not be easy to solder. Although the copper is solderable when freshly plated it soon becomes difficult to solder due to a combination of its thinness coupled with surface oxidation. Also the soldering operation has to be very quick because of the plastic base. It is proposed to improve the solderability by putting down a sheet of tin or solder onto the termination surfaces of the fuse pad. The tin or solder improves the solderability, is thicker than the copper, and it conducts the heat sufficiently to prevent distortion of the plastics. Instead of tin, solder could be used or some other material as described later.

Referring now to FIG. 4 of the drawings, there is shown a plurality of polystyrene particles such as 41 which have been coated by electroless deposition of copper providing a copper layer 42 on each particle.

Figure 4A:
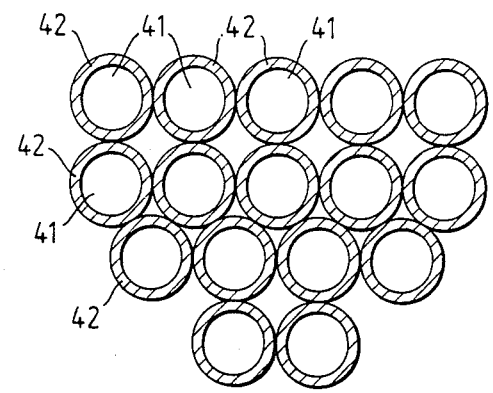
FIG. 4A shows a pile of coated particles for use in the present invention.
Figure 4B:
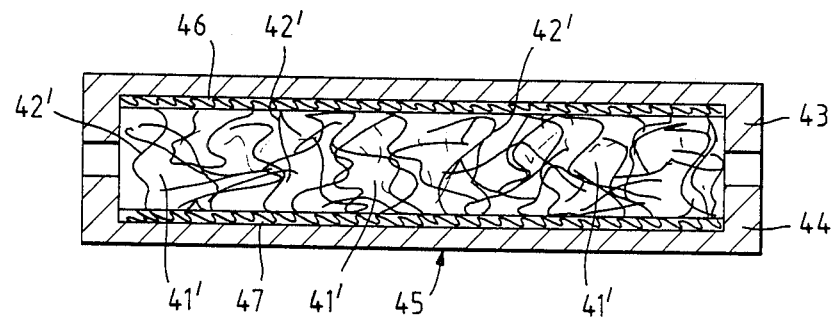
FIG. 4B shows how the particles of FIG. 4B are processed.
Figure 4C:
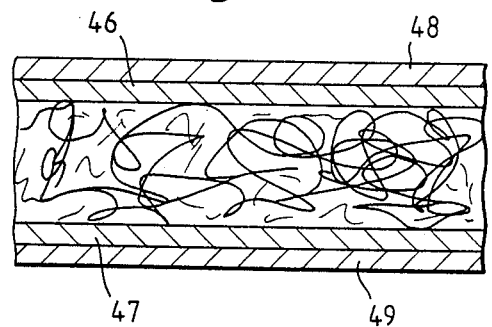
FIG. 4C shows a fusible link according to an embodiment of the invention.

Referring to FIG. 4B this shows the compression at elevated temperature of the particles of FIG. 4A and as can be seen they have been compressed into a continuous polystyrene matrix formed from the coated particles during the moulding operation. As can be seen, the metallic shell continuity is preserved and this is indicated by the criss-crossing lines referenced 42' and the continuous polystyrene matrix is indicated by the reference numeral 41'. The mould comprises mould parts 43 and 44 and the arrows 45 indicate the application of pressure to the mould parts in order to provide the necessary compression for moulding.

On the inside surface of the mould is a sandwich of tin powder indicated by the reference numerals 46 and 47 which is applied to the mould surface prior to pressing the plated beads of FIG. 4A in the mould. The tin powder used in these trials was the BDH Laboratory Reagent "tin metal, fine powder" from BDH Chemicals Ltd, Poole, Dorset, England. The particle size of the powder was less than 20 microns. The tin was shaken into the mould cavities to produce a thin uniform layer onto which the beads were poured. A further layer of tin was then shaken over the upper surface of the column of beads 41, i.e. the beads form a column when they are poured into one mould part say 44, and then the sandwich of materials was compacted at a temperature of 125° C. for the polystyrene beads used in these trials. To prevent the tin sticking to the mould parts 43 and 44, these parts were occasionally sprayed with the d-100 mould release agent (one provided by Industrial Science Ltd, 119–120 Snargate Street, Dover, Kent was suitable).

Produced in this way, the fuse consisted of coherent sheets of tin firmly bonded to the metallic coating on the outside of the compact of compressed beads. The tin was found to be easily solderable and the thickness of the layer was sufficient to ensure that the heat from the soldering operation was not localised in one area resulting in the melting of the polystyrene.

Instead of shaking powder into the mould, the tin could instead be added as a slurry in a volatile liquid, the liquid being allowed to evaporate before the pressing operation in the mould parts 43 and 44. As another alternative, the beads could be compacted without the addition of tin, then the face is coated with tin slurry and the whole sandwich given a second compaction operation.

In place of tin any other conductive powder which readily flows under pressure and which is solderable could be used, for instance, tin-lead alloys or other forms of solder in a finely divided state could be substituted.

As described above, the plaques produced by the moulding operation are cut into small fuse elements. Alternatively the process can be used to derive individual fuse elements directly.

The fuse elements are then clamped between conductive plates and soldered to the conductive plates, or alternatively are sprayed with metal. The fuses so produced are then applied to the capacitor as shown in FIGS. 1, 2 or 3.

The objective of having the conductive plates or the metal spraying, is to provide a larger area of contact to the thin metallic coating on the plastic beads so that the current is not concentrated in restricted areas. In this way, the fusing action will take place in the central regions of the fuse element and not at localised points of external contact. The clamped plates or the sprayed-on metal are indicated by the layers 48 and 49 in FIG. 4C.

As an alternative to compacting the metal coated particles at high temperature and pressure as described above, it would be possible to mix the particles of FIG. 4A with an electrically insulating resin binder to provide a conductive resin which can be applied in place of the fuse pad 6 in FIG. 1 or pad 15 in FIG. 2A or pad 20 in FIG. 2B or pad 35 in FIG. 3. Thus this conductive resin or paste would be applied as a glue to secure the lead frame 8 in FIG. 1 or the bent over end 17 of the lead wire 11 in FIG. 2A or the straight lead wire 19 in FIG. 2B or the axial lead wire 33 in FIG. 3.

This conductive paste once hardened acts as a fusable link when the current rises above a maximum limit because the heat generated has the same effect as described above with the compacted metal polymer matrix.

This alternative embodiment has the advantage of being strong and robust, yet occupying a smaller space.

In one embodiment polystyrene beads were coated with silver and then made into a conductive paste using a liquid epoxy medium. The silver content on the beads was 1.3% W/W which is approximately 0.12% V/V. The epoxy used was Araldite MY 752 mixed with 23.5 p.h.c. Araldite HY 956 hardener (both materials obtainable from Ciba-Geigy Plastics & Additive Company, Duxford, Cambridge, UK). The final silver content of the mixture was 0.78% W/W (approximately 0.08% V/V). The resistivity of a cured strip of the mixture was 0.2 ohms cm.

Because of the size of the beads (0.2–0.5 mm diameter) the mixture was gritty but could still be used as a conductive adhesive. Test pieces were made by attaching unformed anodes into lead frames with the mixture, curing, and then applying increasing currents. The general level of fusing current was 0.25 A flowing for 1–2 seconds.

The plastic base should be smaller than the beads used here in order to improve the smoothness of the mixture. The fusing current could be altered by changing the thickness of the silver which in the embodiment just described was less than 1 micron.

In these trials, a base resin and hardener were used which has a limited shelf life for the mixture. It is proposed that epoxys with pot lives similar to that of existing commercially-available conductive silver pastes be used.

It is also possible that a fusable pad or conductive fusible paste as described in relation to the solid electrolytic capacitors above, could be used in any electronic component, for example a multi-layer ceramic capacitor and could be located or applied in between one surface of the ceramic capacitor and the lead out connection wire in much the same way as has been described with reference to the capacitors above. Thus although ceramic capacitors are not prone to burning in the same way as a tantalum capacitor, if they are encapsulated in plastics material then that in itself provides a component which will burn above a certain temperature and for such encapsulated ceramic capacitors the fusable link described above may be emminently suitable.

I claim:

1. An electrical capacitor comprising a capacitor body which provides the capacitance in use of the capacitor, and lead out terminals for externally connecting the capacitor into an electrical circuit, and a fusable link connected in series with the capacitor body and between the body and one of the connection terminals, said fusable link comprising a matrix of conductive and insulating materials, comprising or derived from metal-coated polymer particles, which is highly conductive under normal operating conditions of the capacitor but which fuses permanently at a temperature below the self-sustaining burning temperature of the capacitor body or any encapsulation around the capacitor body.

2. A capacitor as claimed in claim 1, wherein the matrix is formed of metal-coated polymer particles which have been compressed and distorted.

3. A capacitor as claimed in claim 1 wherein the fusable link comprises a pad of the matrix having major opposed surfaces, one surface being connected to the capacitor body and the other surface being connected to a connection lead.

4. A capacitor as claimed in claim 1, wherein the matrix is in the form of metal-coated polymer particles dispersed in a binder.

5. A capacitor as claimed in claim 4, wherein the fusable link comprises a pad of the matrix having major opposed surfaces, one surface being connected to an anode wire buried in the capacitor body and the other surface being connected to a lead out terminal for external connection to the capacitor.

6. A capacitor as claimed in claim 1, wherein the capacitor is a solid electrolytic tantalum capacitor.

7. A fusable link for an electronic component, comprising a pad of material formed of a matrix of conductive and insulating materials, comprising or derived from metal-coated polymer particles, which is highly conductive at normal operating temperature of the component but which will provide an open circuit at a temperature above the normal operating temperature of the component and below the self-sustaining burning temperature of the component or its encapsulation.

8. A material comprising metal-coated polymer particles dispersed in a liquid resin binder to form a conductive paste which, when the binder has hardened, forms an electrically conductive fusible link.

9. A material as claimed in claim 8, wherein the particles are polystyrene.

10. A material as claimed in claim 9, wherein the metal coating is silver.

* * * * *